(12) United States Patent
Chicca

(10) Patent No.: US 8,205,907 B2
(45) Date of Patent: Jun. 26, 2012

(54) COMPACT FOLDABLE STROLLER

(75) Inventor: Dana E Chicca, Swansea, MA (US)

(73) Assignee: Cosco Management, Inc., Wilmington, DE (US)

( * ) Notice: Subject to any disclaimer, the term of this patent is extended or adjusted under 35 U.S.C. 154(b) by 294 days.

(21) Appl. No.: 12/693,249

(22) Filed: Jan. 25, 2010

(65) Prior Publication Data

US 2011/0181024 A1 Jul. 28, 2011

(51) Int. Cl.
*B62B 1/00* (2006.01)
(52) U.S. Cl. ........ 280/642; 280/643; 280/647; 280/648; 280/650
(58) Field of Classification Search .............. 280/642, 280/643, 647, 648, 650
See application file for complete search history.

(56) References Cited

U.S. PATENT DOCUMENTS

| | | | |
|---|---|---|---|
| 2,986,400 A | 5/1961 | Phillips | |
| 4,216,974 A * | 8/1980 | Kassai | 280/42 |
| 4,294,464 A | 10/1981 | Ettridge | |
| 5,257,799 A * | 11/1993 | Cone et al. | 280/642 |
| 6,095,548 A | 8/2000 | Baechler | |
| 6,102,431 A | 8/2000 | Sutherland et al. | |
| 6,105,998 A * | 8/2000 | Baechler et al. | 280/650 |
| 6,869,096 B2 * | 3/2005 | Allen et al. | 280/642 |
| 6,991,248 B2 * | 1/2006 | Valdez et al. | 280/647 |
| 7,077,420 B1 * | 7/2006 | Santoski | 280/642 |
| 7,185,909 B2 | 3/2007 | Espenshade et al. | |
| 7,237,795 B2 | 7/2007 | Wu | |
| 7,296,820 B2 * | 11/2007 | Valdez et al. | 280/647 |
| 7,396,039 B2 * | 7/2008 | Valdez et al. | 280/644 |
| 7,632,035 B2 * | 12/2009 | Cheng | 280/642 |
| 7,798,500 B2 * | 9/2010 | Den Boer | 280/47.34 |
| 7,798,515 B2 * | 9/2010 | Valdez et al. | 280/647 |
| 8,087,689 B2 * | 1/2012 | Fritz et al. | 280/647 |
| 2006/0038378 A1 | 2/2006 | Lee | |
| 2007/0075525 A1 | 4/2007 | Nolan et al. | |
| 2007/0096434 A1 * | 5/2007 | Haeggberg | 280/642 |

FOREIGN PATENT DOCUMENTS

WO 2008145523 12/2008

OTHER PUBLICATIONS

International Search Report dated Feb. 12, 2009, for International Application No. PCT/US08/86415.

* cited by examiner

*Primary Examiner* — J. Allen Shriver, II
*Assistant Examiner* — James M Dolak
(74) *Attorney, Agent, or Firm* — Barnes & Thornburg LLP

(57) ABSTRACT

A juvenile stroller includes a mobile base and a juvenile seat mounted on the mobile base. The mobile base includes wheels and a foldable frame carrying the juvenile seat.

33 Claims, 6 Drawing Sheets

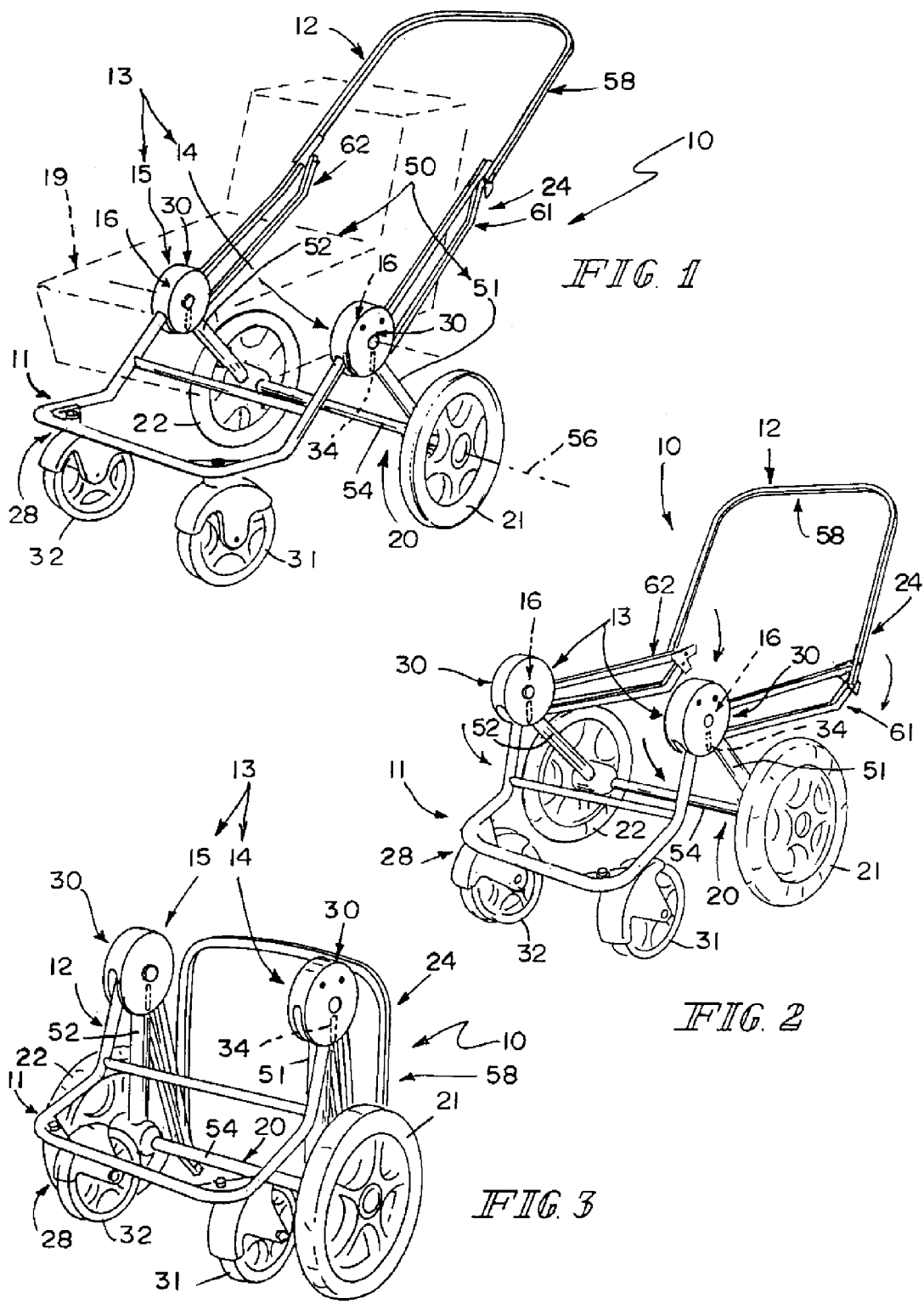

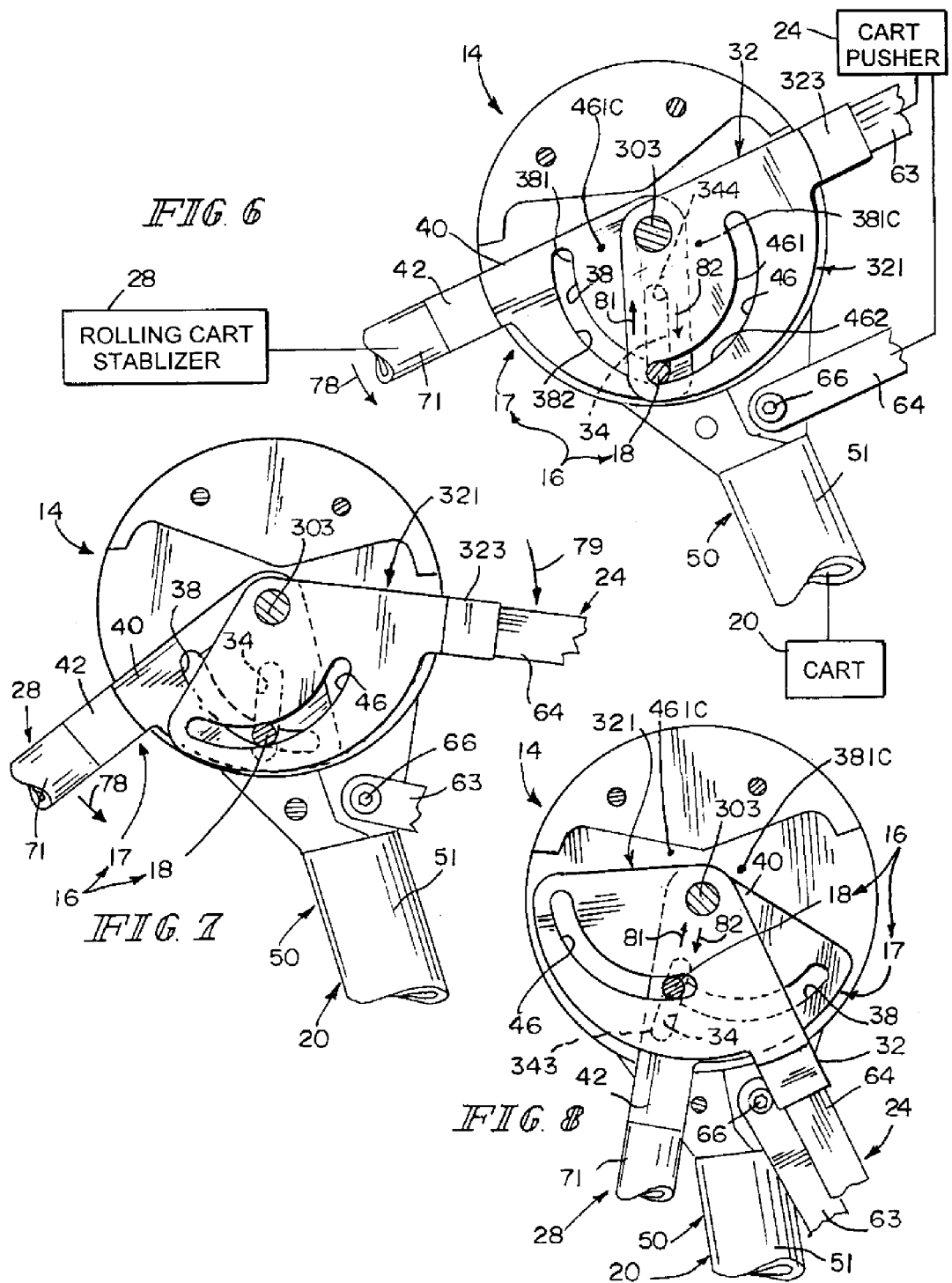

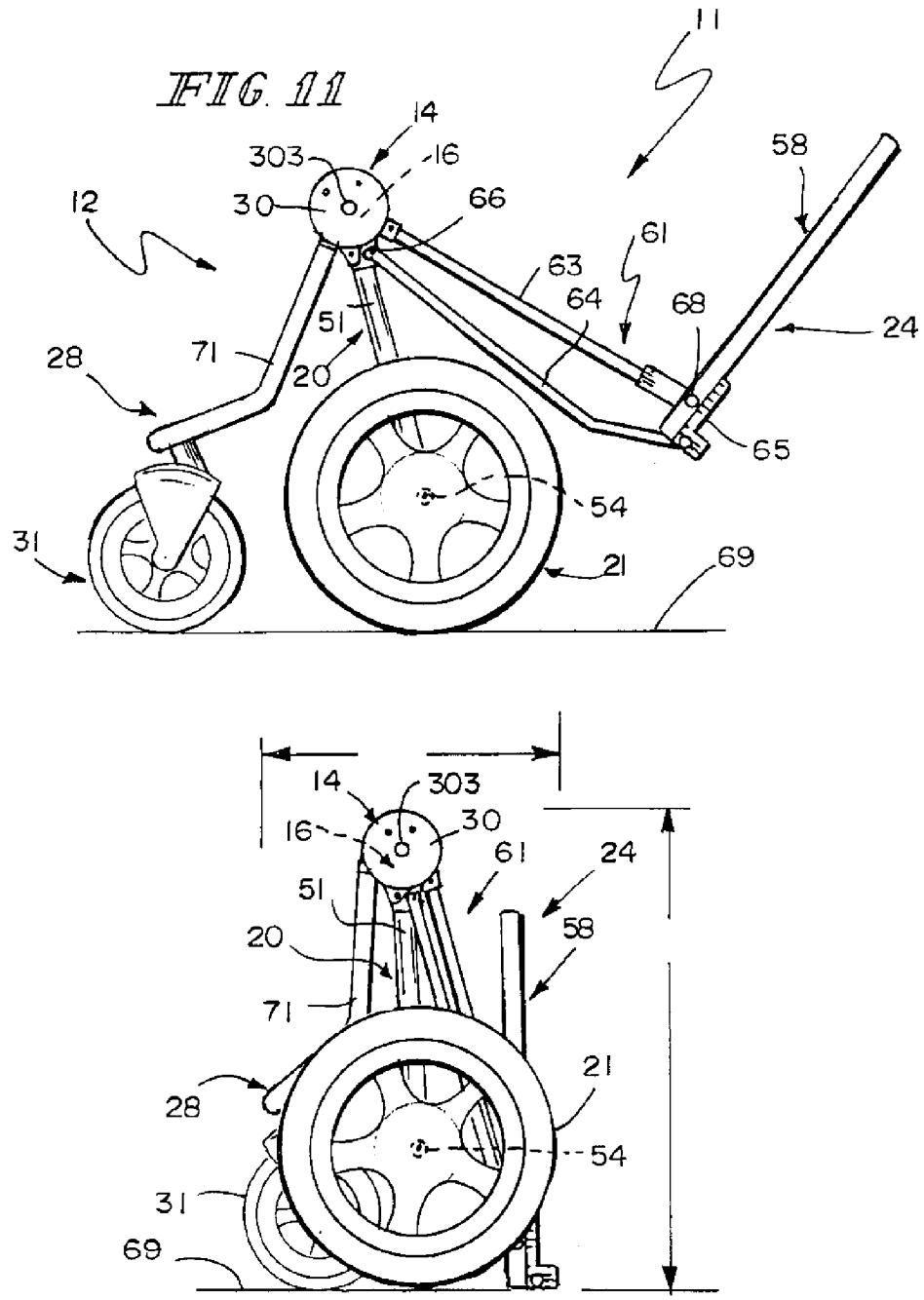

COMPACT FOLDABLE STROLLER

BACKGROUND

The present disclosure relates to collapsible strollers for juveniles, and particularly to strollers including a collapsible frame assembly, a seat, and several wheels. More particularly, the present disclosure relates to collapsible frame assemblies for juvenile strollers.

Juvenile strollers are used widely to transport young children. Foldable strollers including collapsible frame assemblies can be placed in vehicle trunks or storage areas. Caregivers appreciate compact foldable strollers that do not require a lot of storage space so that space is available onboard a vehicle or elsewhere for storage of other items.

SUMMARY

A compact collapsible stroller in accordance with the present disclosure includes a mobile base and a juvenile seat coupled to the mobile base. The mobile base includes a foldable frame and front and rear wheels.

In illustrative embodiments, the mobile base of the compact collapsible stroller comprises a cart including two rear wheels and a cam-driven foldable frame mounted on the cart to move therewith and configured to include two front wheels. The cam-driven foldable frame includes a cart pusher formed to include a push handle, a rolling cart stabilizer configured to include the two front wheels, and a first cam-fold unit coupled to the cart and to each of the cart pusher and the rolling cart stabilizer.

In illustrative embodiments, the first cam-fold unit includes a cam-support base, an inverse cam including a follower and a motion-transfer pin, and a pin mover. The motion-transfer pin is arranged to extend into and move back and forth simultaneously in a straight pin-receiver slot formed in the cam-support base, a curved motion-transfer slot formed in the follower, and a curved motion-inducement slot formed in the pin mover. The pin mover is coupled to the cart pusher to move therewith relative to the cart. The rolling cart stabilizer is coupled to the follower to move therewith relative to the cart.

In use, the motion-transfer pin moves in the three slots in response to caregiver-controlled movement of the cart pusher relative to the cart to cause the rolling cart stabilizer to move relative to the cart between an unfolded (front) position extending away from the cart associated with an expanded use mode of the stroller and a folded (front) position lying alongside the cart associated with a compact collapsed storage mode of the stroller. In illustrative embodiments, the pin mover that is coupled to the cart pusher is configured to move the motion-transfer pin of the inverse cam in each of the slots simultaneously in response to movement of the cart pusher about the pivot axis in a clockwise direction toward the cart to cause the follower and the rolling cart stabilizer coupled to the follower to pivot about the pivot axis in a counterclockwise direction toward the cart to assume a folded front position alongside a front portion of the cart so that the stroller is converted from an expanded use mode to a compact collapsed storage mode. Also in illustrative embodiments, the pin mover is configured to move the motion-transfer pin of the inverse cam in each of the slots simultaneously in response to movement of the cart pusher about the pivot axis in a counterclockwise direction away from the cart to cause the follower and rolling cart stabilizer coupled to the follower to pivot about the pivot axis in a clockwise direction away from the cart to assume an unfolded front position extending in a forward direction away from the cart so that the stroller is converted from the compact collapsed storage mode to the expanded use mode.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a collapsible juvenile stroller (with all fabric coverings omitted) in accordance with the present disclosure that has been altered to assume an expanded use mode and showing that the juvenile stroller comprises a cart including two large rear wheels, a fold-control system including a round first cam-fold unit coupled to a first upright leg included in the cart and a separate round second cam-fold unit coupled to a second upright leg included in the cart, a rolling cart stabilizer coupled to the first and second cam-fold units and configured to include two small front wheels, a cart pusher coupled to the first and second cam-fold units and configured to include a U-shaped push handle and a juvenile seat (shown diagrammatically in phantom) adapted to be mounted to the cart and/or the fold-control system;

FIG. 2 is a perspective view similar to FIG. 1 showing the collapsible juvenile stroller (with the juvenile seat omitted) during counterclockwise folding movement of the rolling cart stabilizer about the first and second cam-fold units toward the cart and simultaneous clockwise folding movement of the cart pusher about the first and second cam-fold units toward the cart under the control of the first and second cam-fold units;

FIG. 3 is a perspective view of the juvenile stroller of FIGS. 1 and 2 (with the juvenile seat omitted) after it has been collapsed by a caregiver to assume a compact collapsed storage mode in a manner shown, for example, in FIGS. 9-12;

FIGS. 6-8 show movement of the motion-transfer pin in the first, second, and third slots provided in the first cam-fold unit to cause counterclockwise pivoting movement of the rolling cart stabilizer toward the cart in response to caregiver-induced clockwise pivoting movement of the cart pusher toward the cart to cause the juvenile stroller to be altered to assume a compact folded storage mode as shown, for example, in FIGS. 3, 8, and 12;

FIG. 6 is an enlarged side elevation view of the first cam-fold unit when the collapsible juvenile stroller is in an expanded use mode shown in FIGS. 1 and 9;

FIG. 7 is a view similar to FIG. 6 when the collapsible juvenile stroller is in a partly collapsed mode as shown in FIG. 2;

FIG. 8 is a view similar to FIGS. 6 and 7 when the collapsible juvenile stroller is in a compact collapsed storage mode as shown in FIGS. 3 and 12; and FIGS. 9-12 are enlarged side elevation views of the portion of the collapsible juvenile stroller of FIG. 2 as it is collapsed to change from the expanded use mode shown in FIG. 9 to the compact collapsed storage mode shown in FIG. 12.

DETAILED DESCRIPTION

Figure 9:
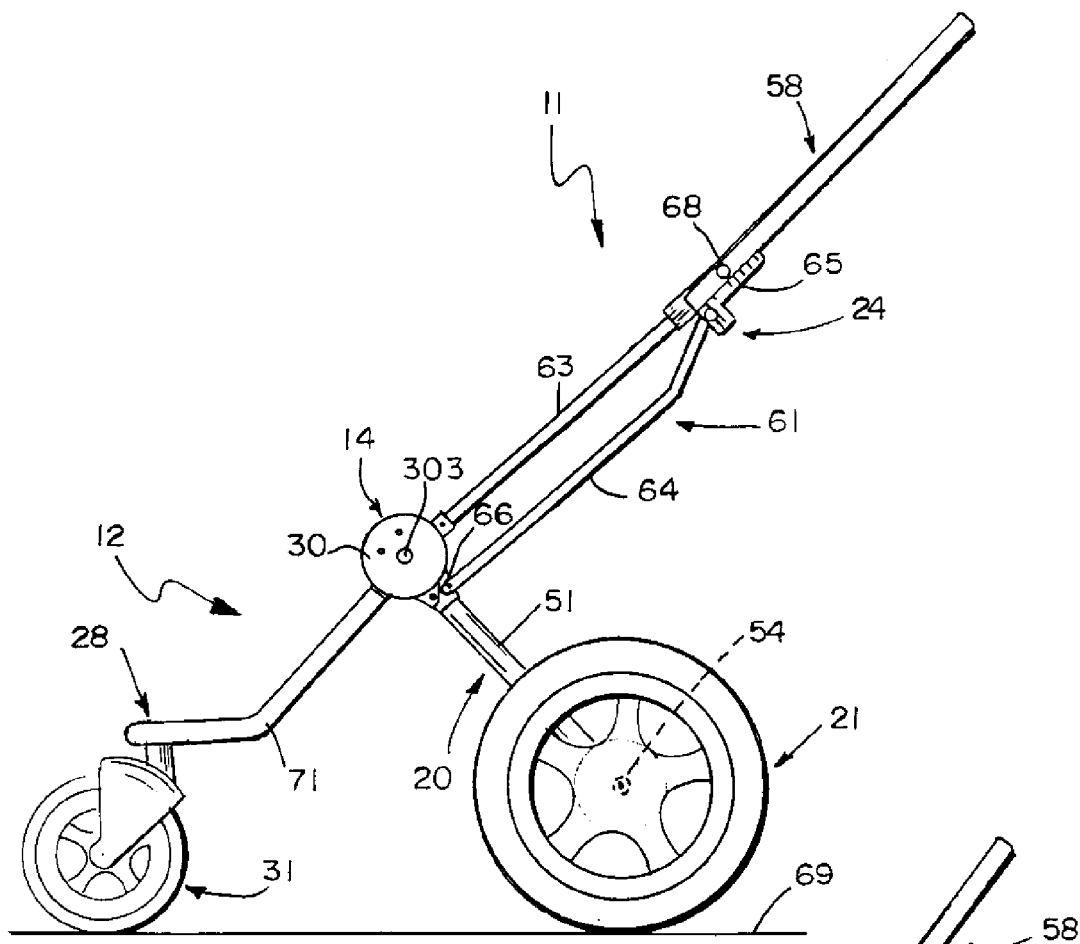
Figure 10:
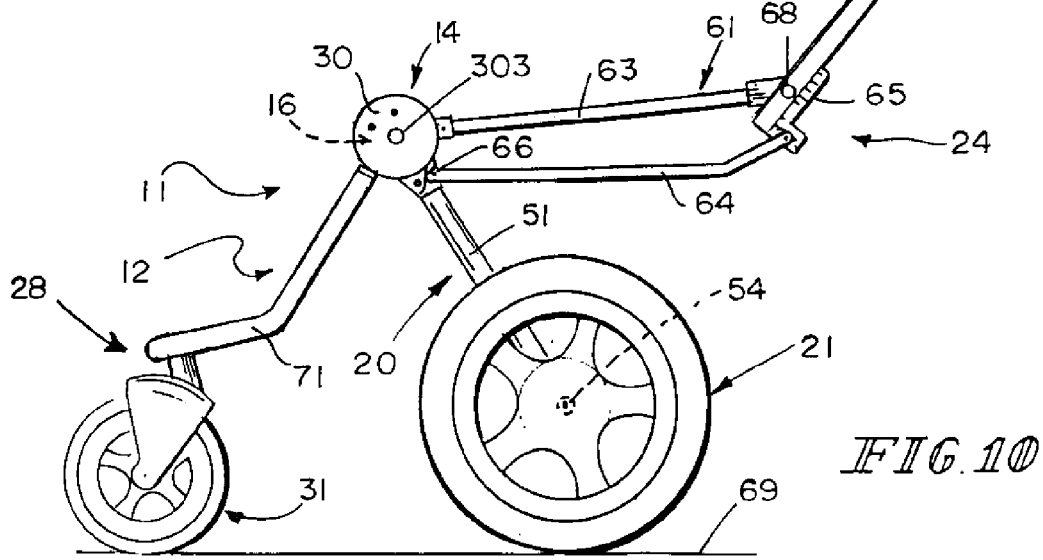

A juvenile stroller 10 is configured to be collapsed by a caregiver to change from an expanded use mode shown, for example, in FIGS. 1 and 9 to a compact collapsed storage mode shown, for example, in FIGS. 3 and 12 in a manner suggested, for example, in FIGS. 9-12. Juvenile stroller 10 includes a cam-driven foldable frame 12 having a fold-control system 13 configured to control folding and unfolding of components included in cam-driven foldable frame 12 as a caregiver changes the mode of juvenile stroller 10. In an illustrative embodiment, fold-control system 13 comprises separate first and second cam-fold units 14, 15 as suggested in FIGS. 1-4. Each cam-fold unit 14, 15 includes an inverse cam 16 comprising a follower 17 and a motion-transfer pin 18 as suggested in FIG. 4.

Juvenile stroller 10 is a compact collapsible stroller including a mobile base 11 and a juvenile seat 19 (shown in phantom) mounted on mobile base 11 for motion therewith as suggested diagrammatically in FIG. 1. In illustrative embodiments, juvenile seat 19 is configured to remain in a mounted position on mobile base 11 during change of juvenile stroller 10 between the expanded use mode suggested in FIG. 1 and the compact collapsed storage mode suggested in FIG. 3. In illustrative embodiments, mobile base 11 includes cam-driven foldable frame 12. It is within the scope of this disclosure to use any suitable juvenile seat.

As suggested in FIG. 1, mobile base 11 of juvenile stroller 10 includes a cart 20 and cam-driven foldable frame 12. Cam-driven foldable frame 12 is mounted for folding and unfolding movement on cart 20 as suggested in FIGS. 1-3 and 9-12. Cart 20 includes first and second rear wheels 21, 22 as suggested in FIGS. 1-4.

Cam-driven foldable frame 12 includes a cart pusher 24, a rolling cart stabilizer 28 including first and second front wheels 31, 32, and the fold-control system 13 including the first and second cam-fold units 14, 15 as suggested in FIGS. 1-4. Cart pusher 24 is arranged to be gripped and pushed by a caregiver (not shown) when juvenile stroller 10 is configured to assume the expanded use mode as suggested in FIGS. 1, 6, and 9. Front wheels 31, 32 included in rolling cart stabilizer 28 lie in spaced-apart relation to rear wheels 21, 22 included in cart 20 to enhance stability of mobile base 11 when juvenile stroller 10 is in the expanded use mode.

Figure 4:
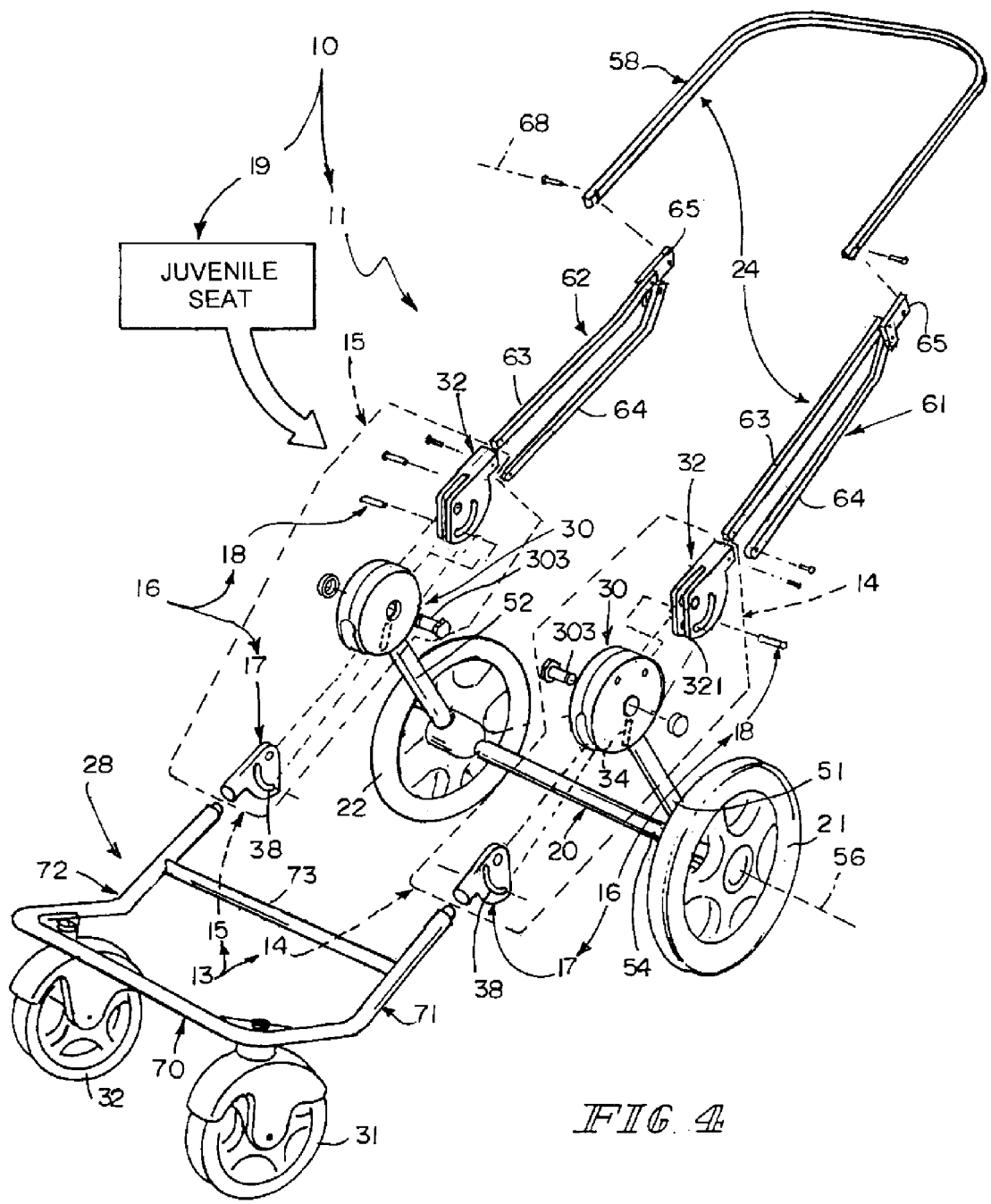
FIG. 4 is an exploded perspective assembly view showing the components that cooperate to form the portion of the juvenile stroller shown in FIGS. 2 and 3 and showing that each of the first and second cam-fold units includes a round hollow cam-support base, a pin mover formed to include a curved motion-inducement slot and adapted to be coupled to the cart pusher, a follower formed to include a curved motion-transfer slot that is arranged to communicate in side-by-side relation with the curved motion-inducement slot during relative pivoting movement of the pin mover and follower about a common pivot axis as suggested in FIGS. 6-8, and a motion-transfer pin sized to extend through both of the curved motion-inducement and motion-transfer slots and through a straight pin-receiver slot formed in the round hollow cam-support base as suggested in FIGS. 5 and 6 and configured to transfer pivoting motion of the cart pusher (induced by a caregiver) during folding of the juvenile stroller to cause the rolling cart stabilizer to pivot toward the cart during pivoting movement of the cart pusher toward the cart as suggested in FIGS. 9-12.
Figure 5:
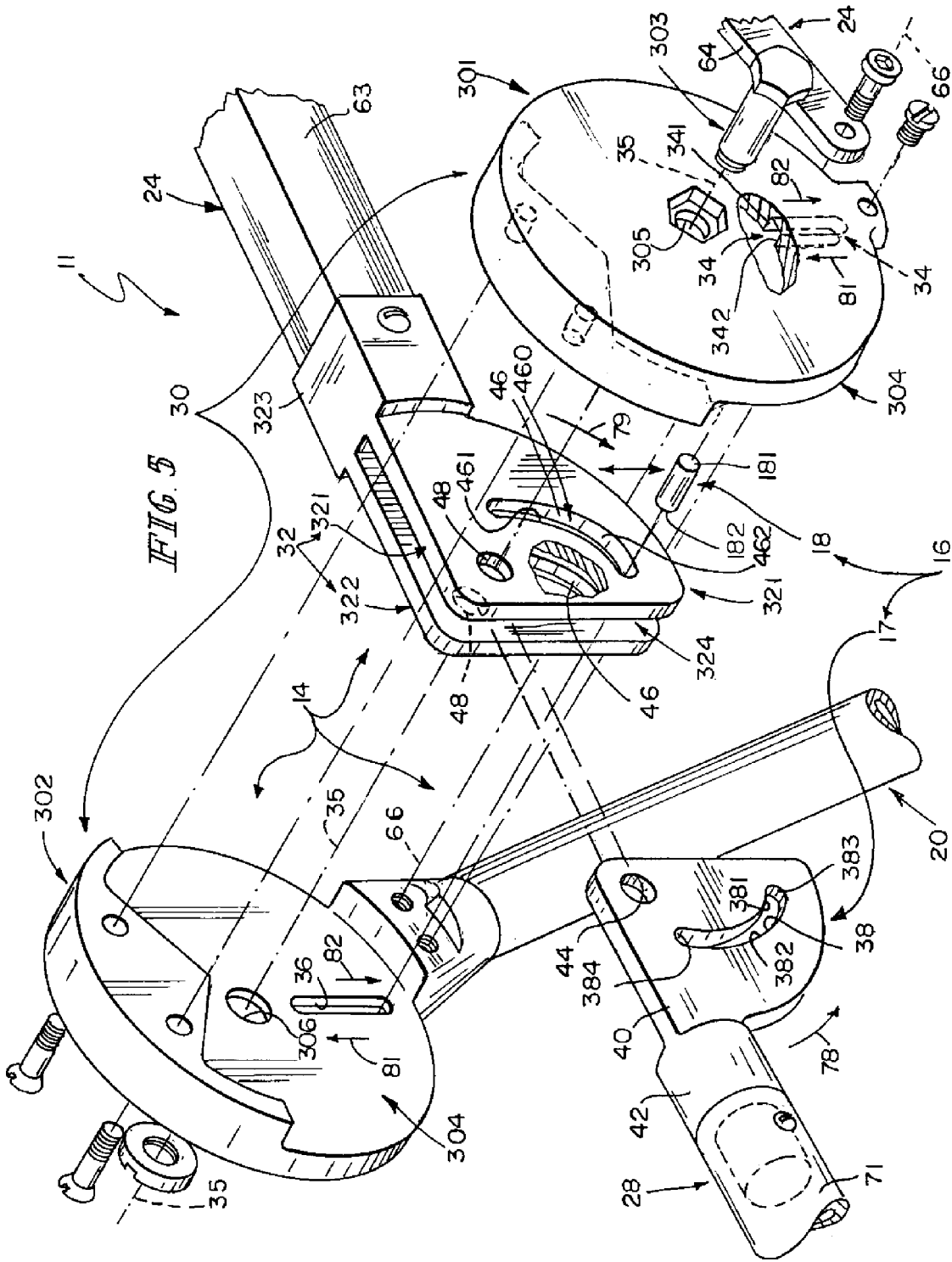
FIG. 5 is an enlarged exploded assembly view of the first cam-fold unit shown in FIG. 4.

First cam-fold unit 14 is coupled to one side of cart 20 and second cam-fold unit 15 is coupled to another side of cart 20 as suggested in FIGS. 1-3. Each of first and second cam-fold units 14, 15 is coupled to cart pusher 24 and to rolling cart stabilizer 28 as suggested in FIGS. 1-3 and functions to move rolling cart stabilizer 28 relative to cart 20 in response to caregiver-initiated movement of cart pusher 24 relative to cart 20. First cam-fold unit 14 includes an illustrative set of components as shown in FIGS. 4 and 5. Second cam-fold unit 15 includes a similar set of components as suggested in FIG. 4.

As suggested in FIG. 5, first earn-fold unit 14 includes a cam-support base 30, an inverse cam 16 including follower 17 and motion-transfer pin 18, and a pin mover 32. Cam-support base 30 is coupled to cart 20 to move therewith as suggested in FIGS. 4 and 5. Follower 17 is coupled to rolling cart stabilizer 28 so that rolling cart stabilizer 28 moves relative to cart 20 when follower 17 is moved relative to cart 20 by movement of motion-transfer pin 18 and pin mover 32 relative to cart 20 as suggested in FIGS. 6-8. Pin mover 32 is coupled to cart pusher 24 so that pin mover 32 moves relative to cart 20 to cause relative movement of motion-transfer pin 18, follower 17, and rolling cart stabilizer 28 relative to cart 20 when cart pusher 24 is moved by a caregiver (not shown) relative to cart 20 as suggested in FIGS. 6-8.

Cam-support base 30 includes a first base member 301, a second base member 302, and a follower axle 303 in an illustrative embodiment shown in FIG. 5. First and second base members 301, 302 are mated to one another to form a space 304 therebetween sized to receive portions of the follower 17 and the motion-transfer pin 18 included in inverse cam 16 and portions of pin mover 32 therein. Fasteners of any suitable kind are used to retain first and second base members 301, 302 in mated relation to one another as suggested in FIGS. 4 and 5. In an illustrative embodiment, follower axle 303 is established by a bolt arranged to extend through a bolt-receiving aperture 305 formed in first base member 301 and a bolt-receiving aperture 306 formed in second base member 302 as suggested in FIG. 5.

First base member 301 is formed to include a pin-receiver slot 34 as suggested in FIGS. 5 and 6-8. One end 181 of motion-transfer pin 18 is arranged to extend into and move back and forth (i.e., up and down) in pin-receiver slot 34 during movement of cart pusher 24 and pin mover 32 relative to cart 20. In an illustrative embodiment, pin-receiver slot 34 is substantially straight and arranged to lie along a line extending through a pivot axis 35 established by follower axle 303 as suggested in FIGS. 5 and 6-8.

Second base member 302 is formed to include an auxiliary pin-receiver slot 36 as suggested in FIG. 5. Another end 182 of motion-transfer pin 18 is arranged to extend into and move back and forth (i.e., up and down) in auxiliary pin-receiver slot 36 when first end 181 of motion transfer pin 18 moves in pin-receiver slot 34 during movement of cart pusher 24 and pin mover 32 relative to cart 20. In an illustrative embodiment, auxiliary pin-receiver slot 36 is substantially straight and arranged to extend along a line extending through pivot axis 35 as suggested in FIG. 5. In an illustrative embodiment, pin-receiver slots 34, 36 are arranged to lie in confronting alignment with one another as suggested in FIG. 5 when first and second base members 301, 302 are mated to one another.

Inverse cam 16 includes follower 17 and motion-transfer pin 18 as suggested in FIG. 5. In an inverse cam, the functions of the parts are reversed (as compared to a traditional cam). In an inverse cam, the body with the groove is the driven member and the roller or other element that moves in the groove is the driver.

In an illustrative embodiment, follower 17 is formed to include a motion-transfer slot 38 as suggested in FIG. 5. Motion-transfer pin 18 is arranged to extend into and move back and forth in motion-transfer slot 38 when motion-transfer pin 18 moves in pin-receiver slots 34, 36 formed in cam-support base 30 during movement of cart pusher 24 and pin mover 312 relative to cart 20 as suggested in FIGS. 6-8.

Motion-transfer slot 38 has a curved shape in the illustrative embodiment shown in FIG. 5. Motion-transfer slot 38 is laid out in accordance with the present disclosure to cause motion-transfer pin 18 to impart a desired motion to follower 17 and to rolling cart stabilizer 28 during movement of cart pusher 24 and pin mover 32 relative to cart 20 as suggested in FIGS. 6-8.

Follower 17 of inverse cam 16 includes a follower plate 40 and a follower-plate connector 42 coupled to follower plate 40 and to rolling cart stabilizer 28 as suggested in FIG. 5. Follower plate 40 is arranged to lie and move in a plate-receiving space 304 formed in cam-support base 30 as suggested in FIG. 5. Follower plate 40 is formed to include motion-transfer slot 38. Follower plate 40 is also formed to include an axle-receiving aperture 44. Follower axle 303 extends through axle-receiving aperture 44 in an illustrative embodiment to provide means for supporting follower 17 for pivotable movement about pivot axis 35 as suggested in FIGS. 6-8.

Pin mover 32 includes first and second pin-motion plates 321, 322 and pin-motion plate connector 323 coupled to cart pusher 24 and to each of pin-motion plates 321, 322 as suggested in FIG. 5. Pin-motion plates 321, 322 are arranged to lie in space-apart parallel relation to one another defining a space 324 therebetween receiving follower plate 40 of follower 17 therein as suggested in FIGS. 5 and 6-8. Each of pin-motion plates 321, 322 is formed to include a motion-inducement slot 46 and an axle-receiving aperture 48 as suggested in FIG. 5. Motion-transfer pin 18 is arranged to extend into and move back and forth in motion-inducement slots 46 during movement of cart pusher 24 and pin mover 32 relative to cart 20. Axle 303 is arranged to extend through axle-receiving apertures 48 to support first and second pin-motion plates 321, 322 for pivotable movement about pivot axis 35.

Motion-inducement slot 46 formed in each of pin-motion plates 321, 322 has a curved shape in the illustrative embodiment shown in FIG. 5. Motion-inducement slots 46 are laid out to cause motion-transfer pin 18 to move along a certain predetermined path as motion-transfer pin 18 also moves in pin-receiver slots 34, 36 and motion-transfer slot 38 as suggested in FIGS. 6-8 during movement of cart pusher 24 and pin mover 32 relative to cart 20.

As suggested in FIG. 1, cart 20 includes a frame mount 50 including first and second upright legs 51, 52 and a wheel axle 54 mounted on frame mount 50 for rotation about axis of rotation 56. It is within the scope of this disclosure to provide frame mount 50 with any suitable configuration. Rear wheels 21, 22 are coupled to opposite ends of wheel axle 54.

Cart pusher 24 includes a push handle 58 and a first and second pivot-control linkages 61, 62 in an illustrative embodiment as suggested in FIGS. 1 and 4. Each of pivot-control linkages 61, 62 includes an upper rail 63, a lower rail 64, and a medial rail 65 as suggested in FIG. 4. Upper rail 63 is coupled at one end thereof to pin-motion plate connector 323 of pin mover 32. Lower rail 64 is mounted on an upright leg 51 or 52 included in frame mount 50 for pivotable movement about a pivot axis 66. Push handle 58 is coupled for pivotable movement to each of medial rails 65 for pivotable movement relative to pivot-control linkages 61, 62 about a pivot axis 68 as suggested in FIGS. 1-4 and 9-12. It is within the scope of this disclosure to provide cart pusher 24 with any suitable shape and structure.

Rolling cart stabilizer 28 includes a wheel-support base 70, first and second base-carrier rails 71, 72, and a support strut 73 interconnecting rails 71, 72 as suggested in FIG. 4. Front wheels 31, 32 are coupled to wheel-support base 70 as suggested in FIG. 4. A free end of first base-carrier rail 71 is coupled to follower connector 42 of follower 17 included in first cam-fold unit 14 as suggested in FIGS. 4 and 5. A free end of second base-carrier rail 72 is coupled to follower 17 included in second cam-fold unit 15 as suggested in FIG. 4. It is within the scope of this disclosure to provide rolling cart stabilizer 28 with any suitable shape and structure.

First cam-fold unit 14 includes a cam-support base 30, inverse cam 16, and pin mover 32 as suggested in FIG. 5. Cam-support base 30 is formed to include a pin-receiver slot 34 and a follower axle 303 as suggested in FIG. 5. Inverse cam 16 includes a follower 17 coupled to rolling cart stabilizer 28 to move therewith and mounted on follower axle 303 to pivot about a pivot axis 35 established by follower axle 303 as suggested in FIGS. 6-8. Inverse cam 16 also includes a motion-transfer pin 18 arranged to extend into and slide back and forth in pin-receiver slot 34 formed in cam-support base 30 and in a motion-transfer slot 38 formed in follower 17 as suggested in FIGS. 6-8.

Pin mover 32 is coupled to cart pusher 14 to move therewith as suggested in FIGS. 6-8. Pin mover 32 is configured to provide means for moving motion-transfer pin 18 in a first direction 81 in pin-receiver slot 34 formed in cam-support base 30 and simultaneously in motion-transfer slot 38 formed in follower 17 as suggested in FIGS. 6-8 to apply a pivot-inducing force to follower 17 to cause follower 17 and rolling cart stabilizer 28 coupled to follower 17 to pivot about pivot axis 35 in a counterclockwise direction 78 toward cart 20 to assume a folded front position alongside a front portion of the cart 20 as suggested in FIGS. 3, 8, and 12 in response to movement of cart pusher 14 about pivot axis 35 in a clockwise direction 79 toward cart 20 so that stroller 10 is converted from an expanded use mode shown in FIG. 1 to a compact collapsed storage mode shown in FIG. 3.

Pin mover is also configured to provide means for alternatively moving motion-transfer pin 18 in a second direction 82 opposite to first direction 81 in pin-receiver 34 slot formed in cam-support base 30 and simultaneously in motion-transfer slot 38 formed in follower 17 to cause follower 17 and rolling cart stabilizer 28 coupled to follower 17 to pivot about pivot axis 35 in a clockwise direction 79 away from cart 20 to assume an unfolded front position extending in a forward direction away from cart 20 as suggested in FIGS. 1, 6, and 9 in response to movement of cart pusher 14 about the pivot axis 35 in a counterclockwise direction 78 away from cart 20 so that stroller 10 is converted from the compact collapsed storage mode shown in FIG. 3 to the expanded use mode shown in FIG. 1.

Pin-receiver slot 34 formed in cam-support base 30 is substantially straight and motion-transfer slot 38 formed in follower 17 is curved. Motion-transfer slot 38 is bounded by a curved inner edge 381 having a first radius of curvature and a curved outer edge 382 having a relatively larger second radius of curvature as shown in FIGS. 5 and 6. Curved outer edge 382 is arranged to lie in spaced-apart relation to curved inner edge 381 and share a center of curvature with curved inner edge 381. Curved inner edge 381 is arranged to lie in a space provided between pivot axis 35 and curved outer edge 392 as suggested in FIG. 6. Curved outer edge 382 has a concave shape and is arranged to face toward pivot axis 35 and curved inner edge 381 has a convex shape and is arranged to face away from pivot axis 35 as suggested in FIG. 6.

Motion-transfer slot 38 is also bounded by a first end edge 383 and an opposite second end edge 384 as suggested in FIG. 5. First end edge 383 interconnects curved inner and outer edges 381, 382 and lies at a first end of motion-transfer slot 38 to mate with motion-transfer pin 18 upon arrival of follower 17 and rolling cart stabilizer 28 at the unfolded front position associated with the expanded use mode of the stroller 10 as suggested in FIG. 6. Second end edge 384 interconnects curved inner and outer side edges 381, 382 and lies at an opposite second end of motion-transfer slot 38 to mate with motion-transfer pin 18 upon arrival of follower 17 and rolling cart stabilizer 28 at the folded front position associated with the compact collapsed storage mode of stroller 10 as suggested in FIG. 8.

Pin-receiver slot 34 is bounded by substantially straight first and second side edges 341, 342 arranged to lie in substantially spaced-apart parallel relation to one another as suggested in FIG. 5, a first end edge 343 arranged to interconnect first and second side edges 341, 342 and to lie in spaced-apart relation to pivot axis 35 at a first end of pin-receiver slot 34 as suggested in FIG. 8, and a second end edge 344 arranged to interconnect first and second side edges 341, 342 and to lie in an opposite second end of pin-receiver slot 34 in a location between the pivot axis 35 and the first end edge 341 associated with pin-receiver slot 34 as suggested in FIG. 6. Motion-transfer pin 18 is arranged to lie in closely confronting relation to first end edge 341 associated with pin-receiver slot 34 upon arrival of follower 17 and rolling cart stabilizer 28 at the unfolded front position associated with the expanded use mode of stroller 10 as suggested in FIG. 6. Motion-transfer pin 18 is arranged to lie in closely confronting relation to second end edge associated with pin-receiver slot 34 upon arrival of follower 17 and rolling cart stabilizer 28 at the folded front position associated with the compact collapsed storage mode of stroller 10 as suggested in FIG. 8.

Pin-oscillator means is defined by an interior wall 460 included in pin mover 32 and configured to form a curved motion-inducement slot 46 receiving motion-transfer pin 18 therein as suggested in FIG. 5. Curved motion-inducement slot 46 is bounded by a curved inner edge having a first radius of curvature and a curved outer edge 462 having a relatively larger second radius of curvature and arranged to lie in spaced-apart relation to curved outer edge 462 and share a center of curvature with curved inner edge 461 as suggested in FIGS. 5 and 6.

Curved outer edge 462 associated with curved motion-inducement slot 46 is configured to provide first mover means for moving motion-transfer pin 18 in pin-receiver slot 34 in the first direction 81 from the first end of pin-receiver slot 34 toward the second end of pin-receiver slot 34 in response to movement of cart pusher 24 about pivot axis 35 in the clockwise direction 79 toward cart 20 as suggested in FIGS. 6-8. Curved inner edge 461 associated with curved motion-inducement slot 46 is configured to provide second mover means for moving motion-transfer pin 18 in pin-receiver slot 34 in the second direction 82 from the second end of pin-receiver slot 34 toward the first end of pin-receiver slot 34 in response to movement of cart pusher 24 about pivot axis 35 in the counterclockwise direction 78 away from cart 20.

Pin mover 32 is coupled to follower axle 303 to pivot about pivot axis 35 established by follower axle 303 in response to movement of cart pusher 24 about pivot axis 35 as suggested in FIGS. 6-8. Curved motion-inducement slot 46 is bounded by a curved inner edge 461 having a first radius of curvature and a curved outer edge 462 having a relatively larger second radius of curvature. Curved outer edge 462 is arranged to lie in spaced-apart relation to curved inner edge 461 and share a center of curvature with curved inner edge 461. Curved inner edge 461 is arranged to lie in a space provided between pivot axis 35 and curved outer edge 462 as suggested in FIGS. 5 and 6. Curved outer edge 462 has a concave shape and is arranged to face toward pivot axis 35 and curved inner edge 461 has a convex shape and is arranged to face away from pivot axis 35 as suggested in FIG. 6.

Cam-support base 30 includes a first base member 301 formed to include pin-receiver slot 34 and a second base member 302 formed to include an auxiliary pin-receiver slot 36 and arranged to cooperate with first base member 301 to form a plate-receiving space 304 therebetween as suggested in FIG. 5. Follower 17 of the inverse cam 16 includes a follower plate 40 formed to include motion-transfer slot 38 and arranged to lie in plate-receiving space 304 in a position between first and second base members 301, 302. Motion-transfer pin 18 is arranged to extend into and move in each of pin-receiver slot 34 formed in first base member 301 and the auxiliary pin-receiver slot 36 formed in second base member 302 and to extend through and move in motion-transfer slot 38 formed in follower plate 40 as suggested in FIGS. 5-8.

Pin mover 32 includes a first pin-motion plate 321 formed to include a motion-inducement slot 46 as suggested in FIG. 5. First pin-motion plate 321 is arranged to lie in plate-receiving space 304 in a position between first base member 301 and follower plate 40 as suggested in FIG. 5.

Motion-transfer pin 18 is arranged to extend through and move in pin-receiver slots 34, 36, motion-transfer slot 58, and motion-inducement slot 46 as suggested in FIGS. 5-8. Pin-receiver slot 34 is substantially straight and each of motion-transfer and motion-inducement slots 38, 46 is curved. Motion-transfer and motion-inducement slots 38, 46 cooperate to form a substantially U-shaped pattern as shown in FIG. 6 when follower 17 and rolling art stabilizer 28 are moved to assume the unfolded front position extending in a forward direction away from cart 20. Motion-transfer and motion-inducement slots 38, 46 cooperate to form a substantially W-shaped pattern as shown in FIG. 8 when follower 17 and rolling cart stabilizer 28 are moved to assume the folded front position alongside the front portion of cart 20.

Motion-transfer slot 38 is bounded in part by a first curved inner edge 381 having a first radius of curvature and a first center of curvature 381C. Motion-inducement slot 46 is bounded in part by a second curved inner edge 461 having a second radius of curvature and a second center of curvature 461C. First and second centers of curvature 381C, 461C are arranged to lie in spaced-apart relation to one another to locate pivot axis 35 between motion-transfer pin 18 and a line intersecting centers of curvature 381C, 461C as suggested in FIG. 8 upon movement of follower 17 and rolling cart stabilizer 28 to assume the folded front position. First and second centers of curvature 381 are arranged to lie in spaced-apart relation to one another to locate a line intersecting centers of curvature 381C, 461C between motion-transfer pin 18 and pivot axis 35 as suggested in FIG. 6 upon movement of follower 17 and rolling cart stabilizer 28 to assume the unfolded front position as shown in FIG. 6. First radius of curvature of curved inner edge 381 is about equal to the second radius of curvature of curved inner edge 461 as suggested in FIG. 8.

Follower 17 of inverse cam 16 includes a follower plate 40 formed to include motion-transfer slot 38 and mounted on follower axle 303 to pivot about pivot axis 35 and a follower-plate connector 42 arranged to interconnect rolling cart stabilizer 28 and follower plate 40 as suggested in FIG. 5. Follower-plate connector 42 is configured to provide means for pivoting rolling cart stabilizer 28 about pivot axis 35 in response to pivoting movement of follower plate 40 about pivot axis 35 as suggested in FIGS. 6-8. Pin mover 32 includes a first pin-motion plate 321 formed to include a motion-inducement slot 46 defining the pin-oscillator means and receiving motion-transfer pin 18 therein and mounted on follower axle 303 to pivot about pivot axis 35 as suggested in FIG. 5. Cam-support base 30 includes first and second base members 301, 302 arranged to lie in spaced-apart relation to one another to locate follower plate 40 in a plate-receiving space 304 provided therebetween as suggested in FIG. 5. Follower-plate connector 42 is arranged to lie outside of plate-receiving space 304 as suggested in FIGS. 6-8.

Pin mover 32 includes a first pin-motion plate 321 located in plate-receiving space 304 and arranged to lie between first base member 301 and follower plate 40 as suggested in FIGS. 5-8. First pin-motion plate 321 is formed to include a motion-inducement slot 46 defining the pin-oscillator means and receiving the motion-transfer pin 18. First pin-motion plate 321 is mounted on follower axle 303 to pivot about pivot axis 35. Pin mover 32 further includes a pin-motion plate connector 323 arranged to interconnect cart pusher 24 and first pin-motion plate 321 and configured to provide means for pivoting first pin-motion plate 321 about pivot axis 35 in response to pivoting movement of cart pusher 24 about pivot axis 35 as suggested in FIGS. 6-8. Pin-motion plate connector 323 of pin mover 32 is arranged to lie outside of plate-receiving space 304 as suggested in FIGS. 6-8.

In operation, as cart pusher 24 is pivoted about pivot axis 35 in a clockwise direction 79, a rotating disk 321 included in pin mover 32 and formed to include a motion-inducement slot 46 moves (e.g., pivots) with cart pusher 24 as suggested in FIGS. 6-8. Edges 461, 462 drives motion-transfer pin 18 in pin-receivers 34, 36 formed in cam-support base 30 to convert rotational motion to linear travel as suggested in FIGS. 6-8. Motion-transfer pin 18 is also arranged to move in motion-transfer slot 38 formed in another rotating disk 40 to convert linear travel back to rotational motion causing rolling cart stabilizer 28 to be pivoted about pivot axis 35 in an opposite clockwise direction 78. Similarly, counter clockwise movement of cart pusher 24 causes clockwise movement of rolling cart stabilizer 28 about pivot axis 35. The slots 46, 34, 36, 38 work in conjunction with one another to create a limit of travel associated with the expanded use mode and the compact collapsed storage mode of juvenile stroller 10. In the present disclosure, there is only one moving part (e.g., motion-transfer pin 18) in each cam-fold unit 14, 15 that transfers rotating motion from one (cam) slot 46 to another (cam) slot 38.

It is within the scope of this disclosure to achieve multiple programmed motions by stacking rotating disks provided with different cam profiles. All the disks are constrained to rotate on a common center and the resulting motions are driven via a single motion-transfer pin arranged to extend into each of the cam slots formed in the disks. Different timing between actions can be accomplished within the scope of the present disclosure by incorporating a straight (dwell) area in the cam slot associated with an individual action. Motion-control is accomplished herein without use of parallelogram (no common center) drive mechanisms or hinges for creating motion from an opened position to a closed position. The common center approach disclosed herein is used for rotating parts in a juvenile stroller 10 (or other apparatus) to create a compact foldable mechanism.

The invention claimed is:

1. A compact collapsible stroller comprising
a mobile base and
a juvenile seat coupled to the mobile base,
wherein the mobile base includes a cart and a cam-driven foldable frame mounted for folding and unfolding movement on the cart and configured to include a cart pusher, a rolling cart stabilizer, and a first cam-fold unit coupled to the cart and to each of the cart pusher and the rolling cart stabilizer,
and wherein the first cam-fold unit includes a cam-support base formed to include a pin-receiver slot and a follower axle, an inverse cam including a follower coupled to the rolling cart stabilizer to move therewith and mounted on the follower axle to pivot about a pivot axis established by the follower axle and a motion-transfer pin arranged to extend into and slide back and forth in the pin-receiver slot formed in the cam-support base and in a motion-transfer slot formed in the follower, and a pin mover coupled to the cart pusher to move therewith and configured to provide pin-oscillator means for moving the motion-transfer pin in a first direction in the pin-receiver slot formed in the cam-support base and simultaneously in the motion-transfer slot formed in the follower to apply a pivot-inducing force to the follower to cause the follower and the rolling cart stabilizer coupled to the follower to pivot about the pivot axis in a counterclockwise direction toward the cart to assume a folded front position alongside a front portion of the cart in response to movement of the cart pusher about the pivot axis in a clockwise direction toward the cart so that the stroller is converted from an expanded use mode to a compact collapsed storage mode and for alternatively moving the motion-transfer pin in a second direction opposite to the first direction in the pin-receiver slot formed in the cam-support base and simultaneously in the motion-transfer slot formed in the follower to cause the follower and rolling cart stabilizer coupled to the follower to pivot about the pivot axis in a clockwise direction away from the cart to assume an unfolded front position extending in a forward direction away from the cart in response to movement of the cart pusher about the pivot axis in a counterclockwise direction away from the cart so that the stroller is converted from the compact collapsed storage mode to the expanded use mode.

2. The stroller of claim 1, wherein the pin-receiver slot formed in the cam-support base is substantially straight and the motion-transfer slot formed in the follower is curved.

3. The stroller of claim 2, wherein the motion-transfer slot is bounded by a curved inner edge having a first radius of curvature and a curved outer edge having a relatively larger second radius of curvature and the curved outer edge is arranged to lie in spaced-apart relation to the curved inner edge and share a center of curvature with the curved inner edge.

4. The stroller of claim 3, wherein the curved inner edge is arranged to lie in a space provided between the pivot axis and the curved outer edge.

5. The stroller of claim 3, wherein the curved outer edge has a concave shape and is arranged to face toward the pivot axis and the curved inner edge has a convex shape and is arranged to face away from the pivot axis.

6. The stroller of claim 3, wherein the motion-transfer slot is also bounded by a first end edge and an opposite second end edge, the first end edge interconnects the curved inner and outer side edges and lies at a first end of the motion-transfer slot to mate with the motion-transfer pin upon arrival of the follower and the rolling cart stabilizer at the unfolded front position associated with the expanded use mode of the stroller, and the second end edge interconnects the curved inner and outer side edges and lies at an opposite second end of the motion-transfer slot to mate with the motion-transfer pin upon arrival of the follower and the rolling cart stabilizer at the folded front position associated with the compact collapsed storage mode of the stroller.

7. The stroller of claim 6, wherein the pin-receiver slot is bounded by substantially straight first and second side edges arranged to lie in substantially spaced-apart parallel relation to one another, a first end edge arranged to interconnect the first and second side edges and to lie in spaced-apart relation to the pivot axis at a first end of the pin-receiver slot, and a second end edge arranged to interconnect the first and second side edges and to lie in an opposite second end of the pin-receiver slot in a location between the pivot axis and the first end edge associated with the pin-receiver slot, and the motion-transfer pin is arranged to lie in closely confronting relation to the first end edge associated with the pin-receiver slot upon arrival of the follower and the rolling cart stabilizer at the unfolded front position associated with the expanded use mode of the stroller and in closely confronting relation to the second end edge associated with the pin-receiver slot upon arrival of the follower and the rolling cart stabilizer at the folded front position associated with the compact collapsed storage mode of the stroller.

8. The stroller of claim 2, wherein the pin-oscillator means is defined by an interior wall included in the pin mover and configured to form a curved motion-inducement slot receiving the motion-transfer pin therein.

9. The stroller of claim 8, wherein the curved motion-inducement slot is bounded by a curved inner edge having a first radius of curvature and a curved outer edge having a relatively larger second radius of curvature and arranged to lie in spaced-apart relation to the curved outer edge and share a center of curvature with the curved inner edge.

10. The stroller of claim 9, wherein the pin-receiver slot is bounded by substantially straight first and second side edges arranged to lie in substantially spaced-apart parallel relation to one another, a first end edge arranged to interconnect the first and second side edges and to lie in spaced-apart relation to the pivot axis at a first end of the pin-receiver slot, and a second end edge arranged to interconnect the first and second side edges and to lie in an opposite second end of the pin-receiver slot in a location between the pivot axis and the first end edge associated with the pin-receiver slot, and the motion-transfer pin is arranged to lie in closely confronting relation to the first end edge associated with the pin-receiver slot upon arrival of the follower and the rolling cart stabilizer at the unfolded front position associated with the expanded use mode of the stroller and in closely confronting relation to the second end edge associated with the pin-receiver slot upon arrival of the follower and the rolling cart stabilizer at the folded front position associated with the compact collapsed storage mode of the stroller, the curved outer edge associated with the curved motion-inducement slot is configured to provide first mover means for moving the motion-transfer pin in the pin-receiver slot in the first direction from the first end of the pin-receiver slot toward the second end of the pin-receiver slot in response to movement of the cart pusher about the pivot axis in the clockwise direction toward the cart, and the curved inner edge associated with the curved motion-inducement slot is configured to provide second mover means for moving the motion-transfer pin in the pin-receiver slot in the second direction from the second end of the pin-receiver slot toward the first end of the pin-receiver slot in response to movement of the cart pusher about the pivot axis in the counterclockwise direction away from the cart.

11. The stroller of claim 8, wherein the pin mover is coupled to the follower axle to pivot about the pivot axis established by the follower axle in response to movement of the cart pusher about the pivot axis.

12. The stroller of claim 11, wherein the curved motion-inducement slot is bounded by a curved inner edge having a first radius of curvature and a curved outer edge having a relatively larger second radius of curvature, the curved outer edge is arranged to lie in spaced-apart relation to the curved outer edge and share a center of curvature with the curved inner edge, the curved inner edge is arranged to lie in a space provided between the pivot axis and the curved outer edge, and the curved outer edge has a concave shape and is arranged to face toward the pivot axis and the curved inner edge has a convex shape and is arranged to face away from the pivot axis.

13. The stroller of claim 1, wherein the cam-support base includes a first base member formed to include the pin-receiver slot and a second base member formed to include an auxiliary pin-receiver slot and arranged to cooperate with the first base member to form a plate-receiving space therebetween, the follower of the inverse cam includes a follower plate formed to include the motion-transfer slot and arranged to lie in the plate-receiving space in a position between the first and second base members, and the motion-transfer pin is arranged to extend into and move in each of the pin-receiver slot formed in the first base member and the auxiliary pin-receiver slot formed in the second base member and to extend through and move in the motion-transfer slot formed in the follower plate.

14. The stroller of claim 13, wherein the pin mover includes a first pin-motion plate formed to include a motion-inducement slot and arranged to lie in the plate-receiving space in a position between the first base member and the follower plate and the motion-transfer pin is arranged to extend through and move in the motion-inducement slot.

15. The stroller of claim 14, wherein the pin-receiver slot is substantially straight and each of the motion-transfer and motion-inducement slots is curved.

16. The stroller of claim 15, wherein the motion-transfer and motion-inducement slots cooperate to form a substantially U-shaped pattern when the follower and the rolling art stabilizer are moved to assume the unfolded front position extending in a forward direction away from the cart and cooperate to form a substantially W-shaped pattern when the follower and the rolling cart stabilizer are moved to assume the folded front position alongside the front portion of the cart.

17. The stroller of claim 14, wherein the motion-transfer slot is bounded in part by a first curved inner edge having a first radius of curvature and a first center of curvature, the motion-inducement slot is bounded in part by a second curved inner edge having a second radius of curvature and a second center of curvature, and the first and second center of curvatures are arranged to lie in spaced-apart relation to one another to locate the pivot axis between the motion-transfer pin and a line intersecting the first and second centers of curvature upon movement of the follower and the rolling cart stabilizer to assume the folded front position.

18. The stroller of claim 17, wherein the first radius of curvature is about equal to the second radius of curvature.

19. The stroller of claim 17, wherein the first and second centers of curvature are arranged to lie in spaced-apart relation to one another to locate a line intersecting the first and second centers of curvature between the motion-transfer pin and the pivot axis upon movement of the follower and the rolling cart stabilizer to assume the unfolded front position.

20. The stroller of claim 1, wherein the follower of the inverse cam includes a follower plate formed to include the motion-transfer slot and mounted on the follower axle to pivot about the pivot axis and a follower-plate connector arranged to interconnect the rolling cart stabilizer and the follower plate and configured to provide means for pivoting the rolling cart stabilizer about the pivot axis in response to pivoting movement of the follower plate about the pivot axis.

21. The stroller of claim 20, wherein the pin mover includes a first pin-motion plate formed to include a motion-inducement slot defining the pin-oscillator means and receiving the motion-transfer pin therein and mounted on the follower axle to pivot about the pivot axis.

22. The stroller of claim 20, wherein the cam-support base includes first and second base members arranged to lie in spaced-apart relation to one another to locate the follower plate in a plate-receiving space provided therebetween and the follower-plate connector is arranged to lie outside of the plate-receiving space.

23. The stroller of claim 22, wherein the pin mover includes a first pin-motion plate located in the plate-receiving space and arranged to lie between the first base member and the follower plate and the first pin-motion plate is formed to include a motion-inducement slot defining the pin-oscillator means and receiving the motion-transfer pin therein.

24. The stroller of claim 23, wherein the first pin-motion plate is mounted on the follower axle to pivot about the pivot axis.

25. The stroller of claim 24, wherein the pin mover further includes a pin-motion plate connector arranged to interconnect the cart pusher and the first pin-motion plate and configured to provide means for pivoting the first pin-motion plate about the pivot axis in response to pivoting movement of the cart pusher about the pivot axis.

26. The stroller of claim 25, wherein the pin-motion plate connector of the pin mover is arranged to lie outside of the plate-receiving space.

27. A compact collapsible stroller comprising
a cart including a frame mount and at least one rear wheel mounted to rotate relative to the frame mount,
a rolling cart stabilizer including a front wheel mount and at least one front wheel mounted to rotate relative to the front wheel mount,
a first cam-fold unit including a cam-support base coupled to the frame mount of the cart to move therewith, an inverse cam including a follower coupled to the rolling cart stabilizer to move therewith and a motion-transfer pin arranged to extend into a pin-receiver slot formed in the cam-support base and a motion-transfer slot formed in the follower, and a pin mover formed to include a motion-inducement slot receiving a portion of the motion-transfer pin therein, and
a cart pusher coupled to the pin mover, wherein the motion-transfer pin is arranged to move in a first direction simultaneously in each of the pin-receiver, motion-transfer, and motion-inducement slots to contact the follower and the pin mover to provide folding means for simultaneously rotating the follower about a pivot axis in a counterclockwise direction and the pin mover about the pivot axis in an opposite clockwise direction to cause the follower and the rolling cart stabilizer coupled to the follower to pivot about the pivot axis in a counterclockwise direction toward the cart to assume a folded front position alongside a front portion of the cart in response to movement of the cart pusher about the pivot axis in a clockwise direction toward an opposite rear portion of the cart so that the stroller is converted from an expanded use mode to a compact collapsed storage mode and to provide unfolding means for simultaneously rotating the follower about the pivot axis in the clockwise direction and the pin mover about the pivot axis in the counterclockwise direction to cause the follower and rolling cart stabilizer coupled to the follower to pivot about the pivot axis in a clockwise direction away from the cart to assume an unfolded front position extending in a forward direction away from the cart in response to movement of the cart pusher about the pivot axis in a counterclockwise direction away from the cart so that the stroller is converted from the compact collapsed storage mode to the expanded use mode.

28. The stroller of claim 27, wherein the cam-support base includes a first base member formed to include the pin-receiver slot and a follower axle coupled to the first base member and arranged to establish the pivot axis, the follower is mounted on the follower axle for rotation about the pivot axis, and the pin mover is mounted on the follower axle for rotation about the pivot axis.

29. The stroller of claim 28, wherein the cam-support base further includes a second base member formed to include an auxiliary pin-receiver slot and the motion-transfer pin is arranged to extend into the auxiliary pin-receiver slot and move therein during movement of the motion-transfer pin in the pin-receiver, motion-transfer, and motion-inducement slots.

30. The stroller of claim 29, wherein the first and second base members cooperate to define a space therebetween containing portions of the follower and pin mover.

31. The stroller of claim 27, wherein each of the motion-transfer and motion-inducement slots are curved and the pin-receiver slot is substantially straight.

32. The stroller of claim 31, wherein the motion-transfer and motion-inducement slots cooperate to form a substantially U-shaped pattern when the follower and the rolling art stabilizer are moved to assume the unfolded front position extending in a forward direction away from the cart and cooperate to form a substantially W-shaped pattern when the follower and the rolling cart stabilizer are moved to assume the folded front position alongside the front portion of the cart.

33. A compact collapsible stroller comprising
a mobile base and
a juvenile seat coupled to the mobile base,
wherein the mobile base includes a cart and a cam-driven foldable frame mounted for folding and unfolding movement on the cart and configured to include a cart pusher, a rolling cart stabilizer, and a first cam-fold unit coupled to the cart and to each of the cart pusher and the rolling cart stabilizer,
and wherein the first cam-fold unit includes a cam-support base formed to include a pin-receiver slot and a follower axle, an inverse cam including a follower coupled to the rolling cart stabilizer to move therewith and mounted on the follower axle to pivot about a pivot axis established by the follower axle and a motion-transfer pin arranged to extend into and slide back and forth in the pin-receiver slot formed in the cam-support base and in a motion-transfer slot formed in the follower, and a pin mover coupled to the cart pusher to move therewith and formed to include a curved motion-inducement slot, and the motion-transfer pin is arranged to extend into and slide back and forth in the curved motion-inducement slot during movement of the curved motion-transfer slot and the substantially straight pin-receiver slot.

* * * * *